(12) United States Patent
Wong et al.

(10) Patent No.: US 9,602,419 B2
(45) Date of Patent: *Mar. 21, 2017

(54) MINIMIZING NETWORK BANDWIDTH FOR VOICE SERVICES OVER TDM CES

(71) Applicant: ALCATEL-LUCENT CANADA INC., Ottawa (CA)

(72) Inventors: Kin Yee Wong, Ottawa (CA); Chad V. McCarthy, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 43 days.

This patent is subject to a terminal disclaimer.

(21) Appl. No.: 14/502,149

(22) Filed: Sep. 30, 2014

(65) Prior Publication Data

US 2016/0094482 A1 Mar. 31, 2016

(51) Int. Cl.
*H04L 12/911* (2013.01)
*H04L 12/721* (2013.01)
*H04L 12/825* (2013.01)

(52) U.S. Cl.
CPC ............ *H04L 47/266* (2013.01); *H04L 45/68* (2013.01)

(58) Field of Classification Search
CPC ...... H04L 47/826; H04L 45/68; H04L 47/825
(Continued)

(56) References Cited

U.S. PATENT DOCUMENTS 6,870,837 B2 3/2005 Ho et al.
7,292,546 B2 11/2007 Moldestad et al.
(Continued)

OTHER PUBLICATIONS

Vainshtein et al (RFC 5086, "Structure-Aware Time Division Multiplexed (TDM) Circuit Emulation Service over Packet Switched Network (CESoPSN)," Published Dec. 2007.*

*Primary Examiner* — Ronald B Abelson
(74) *Attorney, Agent, or Firm* — Marks & Clerk (57) ABSTRACT

A method and system are provided for reducing bandwidth usage in TDM CES systems conveying analog data, such as voice data. A transmitting router receiving TDM frames for packetization monitors the digitized analog data in the TDM frames. If the analog data has not changed beyond a configured threshold for a configured length of time, the transmitting router signals the receiving router at the far end of a TDM Pseudowire that no packets for the TDM Pseudowire will be sent. The transmitting router does not send any packets over the TDM Pseudowire, not even packets with empty payloads. The receiving router a receiving such a signal starts to generate its own packets for placing in its jitter buffer. Valid data already within the jitter buffer is played out to the access port, but once this runs out dummy packets placed in the jitter buffer by the receiving router are played out. In this way the jitter buffer maintains its fill level even when no packets are being sent across the TDM Pseudowire. The transmitting router continues to monitor the received digitized analog data, and only when it determines that the analog data has changed beyond the threshold does the transmitting router signal the receiving router, and begins sending packets once again. The method and system thereby reduce the bandwidth usage in TDM CES systems conveying analog data by refraining from needlessly sending packets over the TDM-Pseudowire when the analog data is not changing.

18 Claims, 6 Drawing Sheets

(58) Field of Classification Search
USPC .......................................................... 370/352
See application file for complete search history.

(56) References Cited

U.S. PATENT DOCUMENTS

| | | |
|---|---|---|
| 7,515,605 B2 | 4/2009 | Harel et al. |
| 9,210,075 B2* | 12/2015 | Bhattacharya .......... H04L 45/50 |
| 2004/0179555 A1 | 9/2004 | Smith |
| 2005/0128054 A1* | 6/2005 | Glickman ........ G08B 13/19606 340/7.2 |
| 2007/0112503 A1* | 5/2007 | Johnson ............... G08G 1/0104 701/117 |
| 2009/0109837 A1* | 4/2009 | Kini ........................ H04L 41/06 370/216 |
| 2010/0165922 A1* | 7/2010 | Wang ..................... H04S 1/007 370/328 |

* cited by examiner

MINIMIZING NETWORK BANDWIDTH FOR VOICE SERVICES OVER TDM CES

FIELD OF INVENTION

This invention relates to CESOP services, and more particularly to reduction of bandwidth in voice traffic using such services.

BACKGROUND

Core networks are evolving to packet switched networks and old TDM-type networks are gradually being replaced. However many legacy TDM services still exist. These TDM services may be for trunking links (T1/E1/DS3/SONET/SDH) or for voice services, for example. Circuit Emulation Services (CES) are used to provide TDM services in IP/MPLS networks in order to take advantage of these packet switched networks. A TDM Pseudowire (PW) is established across the packet switched network. TDM frames are received from an access circuit at a router at the edge of the packet switched network through an access port on the router. The router then encapsulates the TDM frames and transmits the encapsulated TDM data as packets to a receiving router over the TDM-FW through the packet switched network. IETF and MEF have multiple standards that define how to encapsulate TDM services into TDM-PWs.

One example of a TDM service is G.711 pulse-code modulated voice services. A codec digitizes analog voice traffic using pulse code modulation (PCM). Voice compression techniques within the codec, using special digital signal processors or voice processors, compress the digital traffic. This compressed voice traffic is then sent as the payload of TDM frames to a router at the edge of the packet switched network. The router encapsulates the TDM frames into packets. The packets are sent over the packet switched network and received at a second router, where the compressed voice data is extracted from the received packets and sent as TDM frames to a TDM service.

Even though the bandwidth of TDM PWs in routers is usually small compared to the bandwidth used by other IP or Ethernet services, there are many instances where network operators have small network links and the TDM PW bandwidth is too high. Examples of small network links are microwave communication links and NxT1 channels in SONET. The compression techniques used within the codec can reduce the amount of data being carried. However there is scope for reducing the bandwidth usage in a TDM-PW carrying voice traffic, or indeed any analog traffic, even more.

There is a need to provide a method and system in which the network operator has more flexibility regarding bandwidth usage in CES.

SUMMARY

According to one aspect, a method of reducing bandwidth usage in a TDM-PW (time division multiplexing pseudowire) conveying digitized analog data is provided. A transmitting router receiving the digitized analog data in TDM frames determines whether the analog data has changed beyond a threshold for a configured length of time. Upon determining that the analog data has not changed beyond a threshold for the configured length of time, the transmitting router signals to a receiving router that no packets corresponding to the TDM-PW will be sent, and refrains from transmitting packets over the TDM-PW. Upon receipt of such a signal, the receiving router generates packets and places the generated packets in a jitter buffer of the receiving router.

According to another aspect, a router providing circuit emulation services for digitized analog data is provided. The router includes a processor and memory. The memory includes instructions that, when executed by the processor, cause the router to determine that the analog data has changed beyond a threshold for a configured length of time. The memory also includes instructions that cause the router to, upon such a determination, signal to a receiving router at the other end of the TDM-PW that no packets will be sent over the TDM-PW and to halt transmitting packets over the TDM-PW.

According to yet another aspect, another router providing circuit emulation services for digitized analog data is provided. The router includes a processor and memory. The memory includes instructions that, when executed by the processor, cause the router to monitor for receipt of a signal from a transmitting router at the other end of a time division multiplexing pseudowire (TDM-PW) that no packets are being sent over the TDM-PW. The memory also includes instructions that cause the router to, upon receipt of such a signal, generate packets and place the generated packets in a jitter buffer.

The methods of embodiments of the invention may be stored as logical instructions on a non-transitory computer-readable storage medium in a form executable by a computer processor.

Embodiments of the invention allow the reduction of bandwidth in CES. In response to data unchanging within configurable thresholds, a source-end router of the TDM PW notifies the destination-end router not to expect any packets at all, and sends no packets. Thereafter no packets are sent at all until the data is once again changing more than the configurable amount. The notification ensures that the destination-router can bypass its jitter buffer be generating its own TDM frames, thereby maintaining the fill-level of the jitter buffer of the destination-router.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
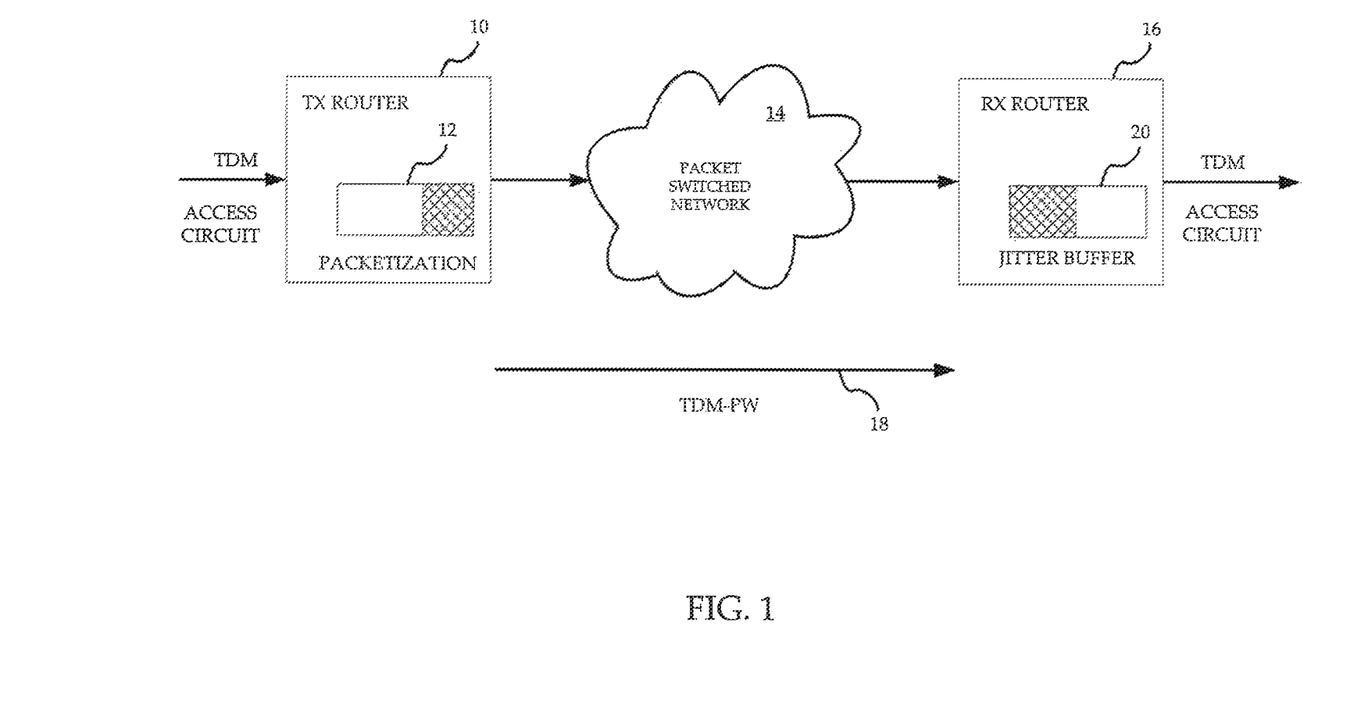
FIG. 1 is a block diagram of a portion of a TDM CES system.

Referring to FIG. 1, a block diagram of a portion of a TDM (time-division multiplexing) CES (circuit emulation service) system according to one embodiment of the invention is shown. TDM data is passed to a transmitting router 10 through an access circuit, the transmitting router 10 providing CES. A CESoP (circuit emulation service over packet) processor (not shown in FIG. 1) within the transmitting router 10 packetizes 12 the TDM data. In normal operation the transmitting router sends the encapsulated TDM data as packets through a packet switched network 14 to a receiving router 16, which also provides CES, over a TDM-Pseudowire (PW) 18. At the receiving router 16 a CESoP processor places the incoming packets in a jitter buffer 20, and then sends the packets to a TDM interworking function where the data is played out in a TDM bitstream and sent to an access circuit.

The TDM data arrives at the transmitting router 10 over any TDM circuit, such as RS-232, C.3794, DS0, DS1, DS3, E1, E3, SONET, or SDH, as examples. Implementations of the TDM-PW are defined in IETF RFC 5086, IETE RFC 4553, and MEF.8. The TDM data contains digitized analog traffic, such as digitized voice traffic.

The routers in FIG. 1 have been named a transmitting router and a receiving router. For the sake of clarity, conveying of TDM data over the packet switched network 14 is shown in FIG. 1 in one direction only. TDM data is of course conveyed in the other direction as well (i.e. to the left in FIG. 1), with what is denoted as the transmitting router 10 also having a jitter buffer and what is denoted as the receiving router 16 also having a packetization functionality. However, for the purposes of this description, only traffic in one direction (i.e. to the right in FIG. 1) will be considered.

Figure 2:
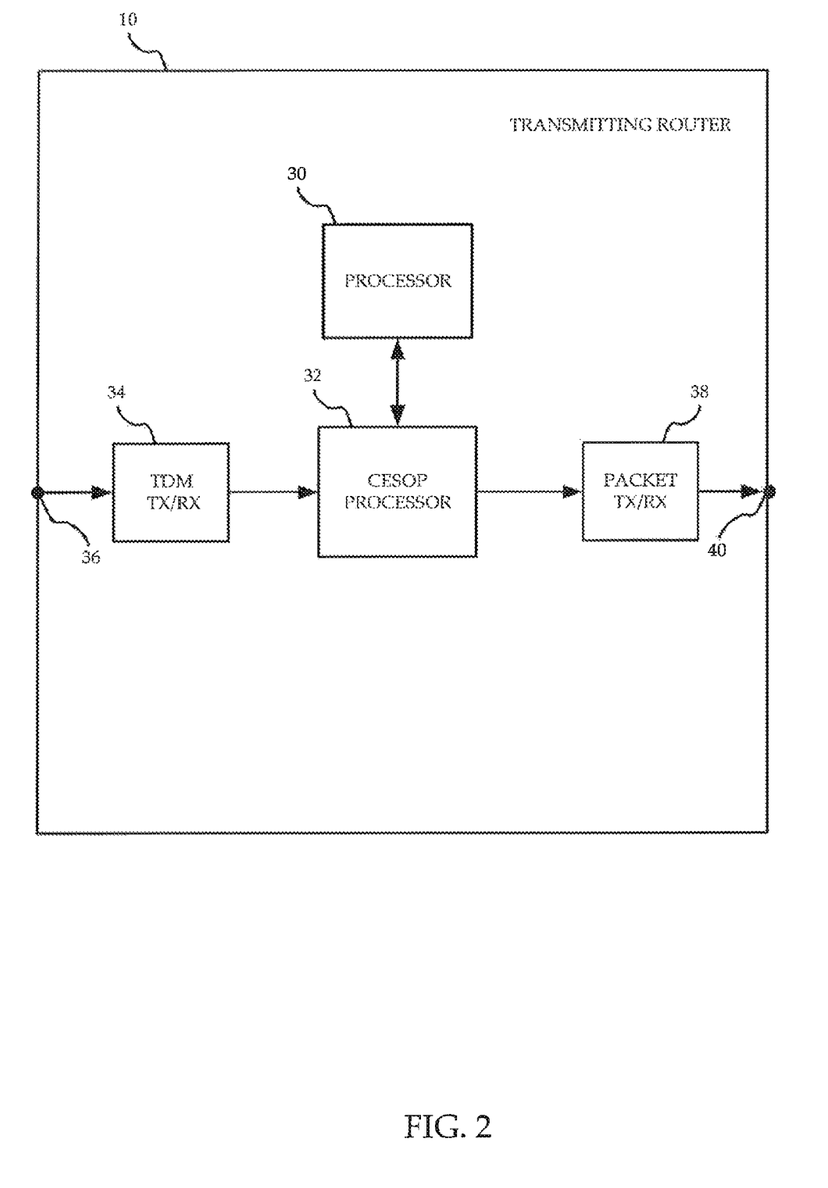
FIG. 2 is a block diagram of portions of the transmitting router of FIG. 1.

Referring to FIG. 2, a simplified block diagram of the transmitting router 10 of FIG. 1 is shown. In particular, FIG. 2 shows the components of the transmitting router 10 involved in Circuit Emulation Service over Packet (CESoP) operations. The transmitting router 10 includes a general purpose processor 30. The general purpose processor 30 is in communication with a CESoP processor 32 which controls the CESoP functions of the transmitting router 10. The CESoP processor 32 includes the TDM interworking function and is in communication with a TDM transmit/receive function 34, which receives TDM data through an access port 36. The CESoP processor 32 is also in communication with a packet transmit/receive function 38, including a packet switch and interfaces, which in turn is in communication with the rest of the packet switched network 14 (not shown in FIG. 2) through a port 40.

Figure 3:
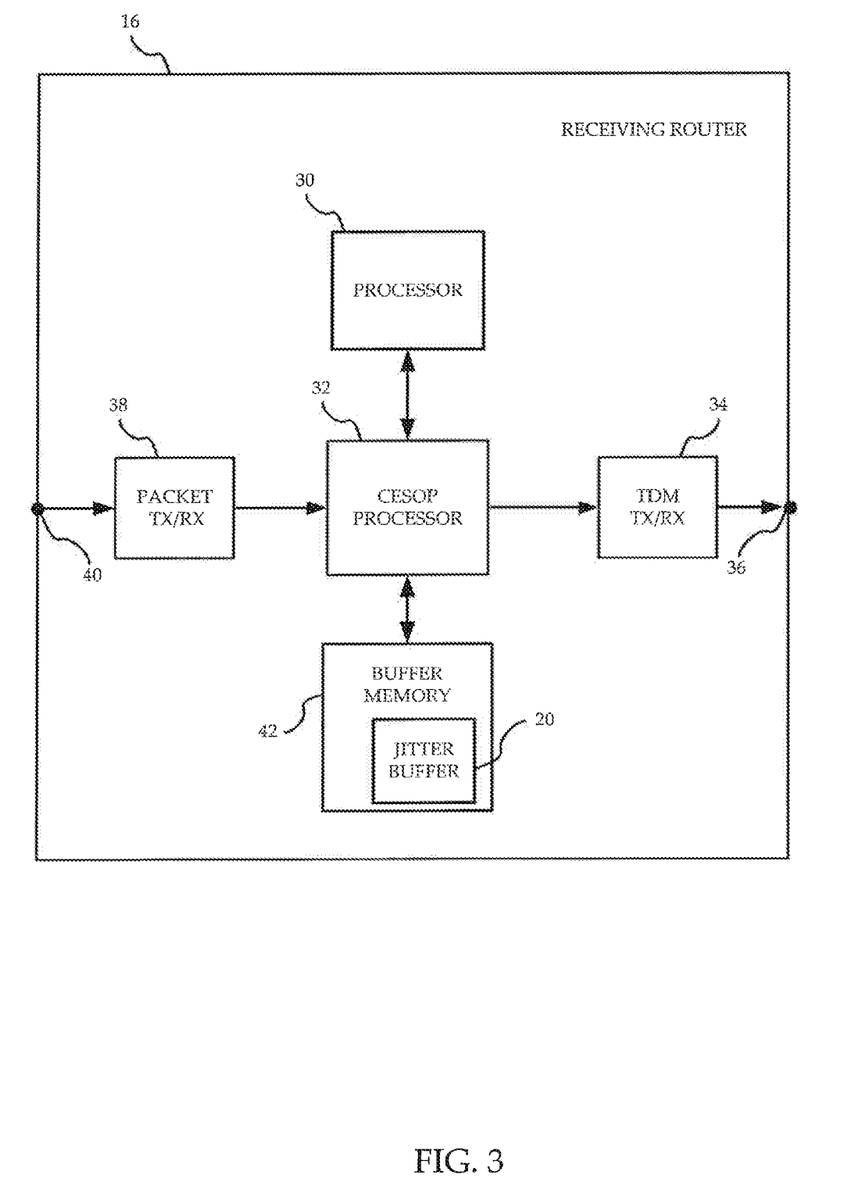
FIG. 3 is a block diagram of portions of the receiving router of FIG. 1.

Referring to FIG. 3, a simplified block diagram of the receiving router 16 of FIG. 1 is shown. The receiving router 16 includes the same components as shown in FIG. 2. In addition, the jitter buffer 20 is considered. The CESoP processor 32 is in communication with a buffer memory 42. A portion of the buffer memory 42 comprises the jitter buffer 20.

Broadly, a transmitting router receiving digitized analog data in TDM frames determines whether the analog data has changed beyond a threshold for a configured length of time. Upon determining that the analog data has changed beyond the threshold, the transmitting router signals to a receiving router that no packets corresponding to the TDM-PW will be sent, and refrains from transmitting packets over the TDM-PW. Upon receipt of such a signal, the receiving router generates packets and places the generated packets in a jitter buffer of the receiving router.

Figure 4:
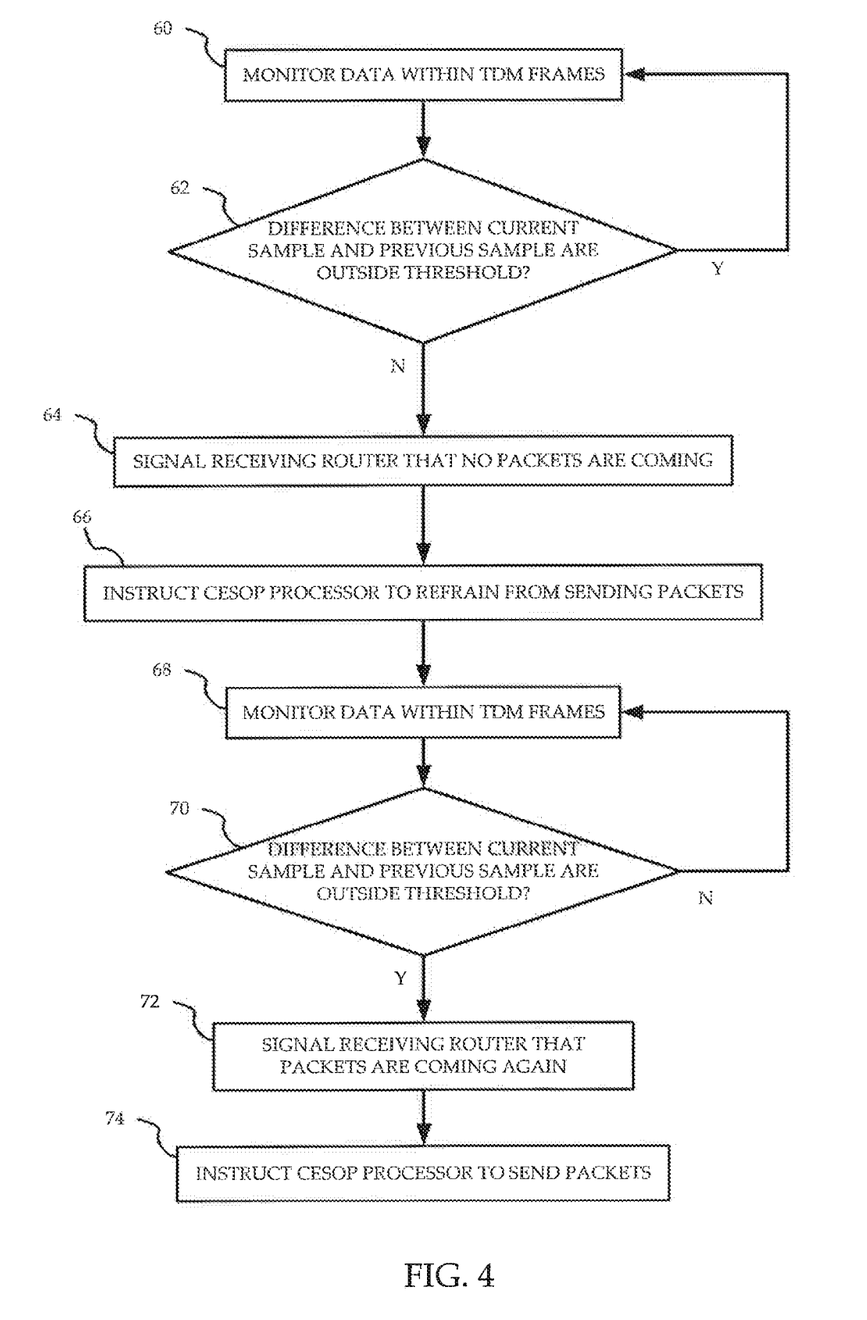
FIG. 4 is a flowchart of a method carried out by the transmitting router of FIG. 1 according to one embodiment of the invention.

Referring to FIG. 4, a flowchart of a method carried out by the transmitting router 10 of FIG. 1 according to one embodiment of the invention is shown. The method is carried out by the general purpose processor 30 of the transmitting router 10. TDM data is already being received by the transmitting router, being encapsulated, and being sent over the TDM-PW 18 to the receiving router 16. As TDM frames are received, at step 60 the general purpose processor 30 monitors the data within the TDM frames, looking at each sample of the voice data. The samples are digital data representing the digitization of the analog signal at a sampling frequency. The TDM frames contain a series of bytes, each byte being an 8-bit representation of the digitized analog signal.

At step 62 the general purpose processor compares each byte with the previously N–1 received bytes containing digitized analog data to determine whether the digitized analog data has not changed beyond a threshold over N bytes. Both the threshold and the value of N are configurable. The threshold is configurable to reflect the number of most-significant bits that must match in order for the general purpose processor 30 to conclude that the analog signal has not changed. For example, because the least significant bit (LSB) in digitized voice data is almost undetectable, in-band Rob Bit Signaling can be used and the LSB can be ignored, and the threshold is set so that if the seven most significant bits match then it is concluded that the data is not changing. As another example, the threshold could be set so that all 8 bits must match. The value of N is configurable to reflect the amount of time in which the input signal must be continuously constant in order to conclude that the input signal is unchanging. Setting this value may be considered more generally as setting the amount of time for which the signal must not change.

If at step 62 the comparison reveals that the analog data is changing beyond the configured threshold, then the behaviour of the transmitting router 10 is not changed and the general purpose processor 30 returns to monitoring received TDM frames at step 60. However if the comparison at step 62 reveals that the analog data is not changing beyond the configured threshold, then at step 64 the general purpose processor 30 causes the transmitting router 10 to signal to the receiving router 16 that no data will be coming over the TDM-PW 18 until further notice. The transmitting router 10 can send this signal in any of a number of ways. For example, the transmitting router 10 can send the signal implicitly by setting the L and M bits in the LRM bits of the TDM-PW control word of a packet to a particular value. This is possible because under RFC 5086 there exist "Reserved for future use" combinations for four of the L and M bit combinations. As another example, the transmitting router 10 can send an explicit out-of-band signal at the signaling layer of MPLS.

At step 66 the processor 30 instructs the CESoP processor 32 to refrain from sending packets over the TDM-PW 18 to the receiving router 16. At step 68 the general purpose processor 30 monitors again each sample of the voice data.

At step 70 the general purpose processor 30 determines again whether the current byte has changed beyond the configured threshold. However this time the comparison is only with the preceding byte, not the preceding N bytes. If it is determined that the analog data has not changed beyond the configured threshold, then the general purpose processor 30 returns to monitoring received bytes at step 68.

However, if the comparison at step 70 reveals that the analog signal has changed, then at step 72 the general purpose processor 30 causes the transmitting router 10 to signal the receiving router 16 that valid data is coming once again. This can be done using either an explicit signal (such as if the signaling is by way of out-of-band signaling using the signaling layer of MPLS) or done implicitly (such as by transmitting encapsulated TDM data to the receiving router with the L and M bits in the TDM-PW control word set to values that indicate a valid CESoP packet). At step 74 the general purpose processor 30 instructs the CESoP processor 32 to resume sending packetized TDM data.

In one embodiment, the steps 72 and 74 are combined. In other words, the signaling that valid TDM data is coming is performed by simply transmitting a packet containing valid TDM data as payload data, with the TDM-PW control word of the packet indicating that the payload contains valid CESoP data.

Figure 5:
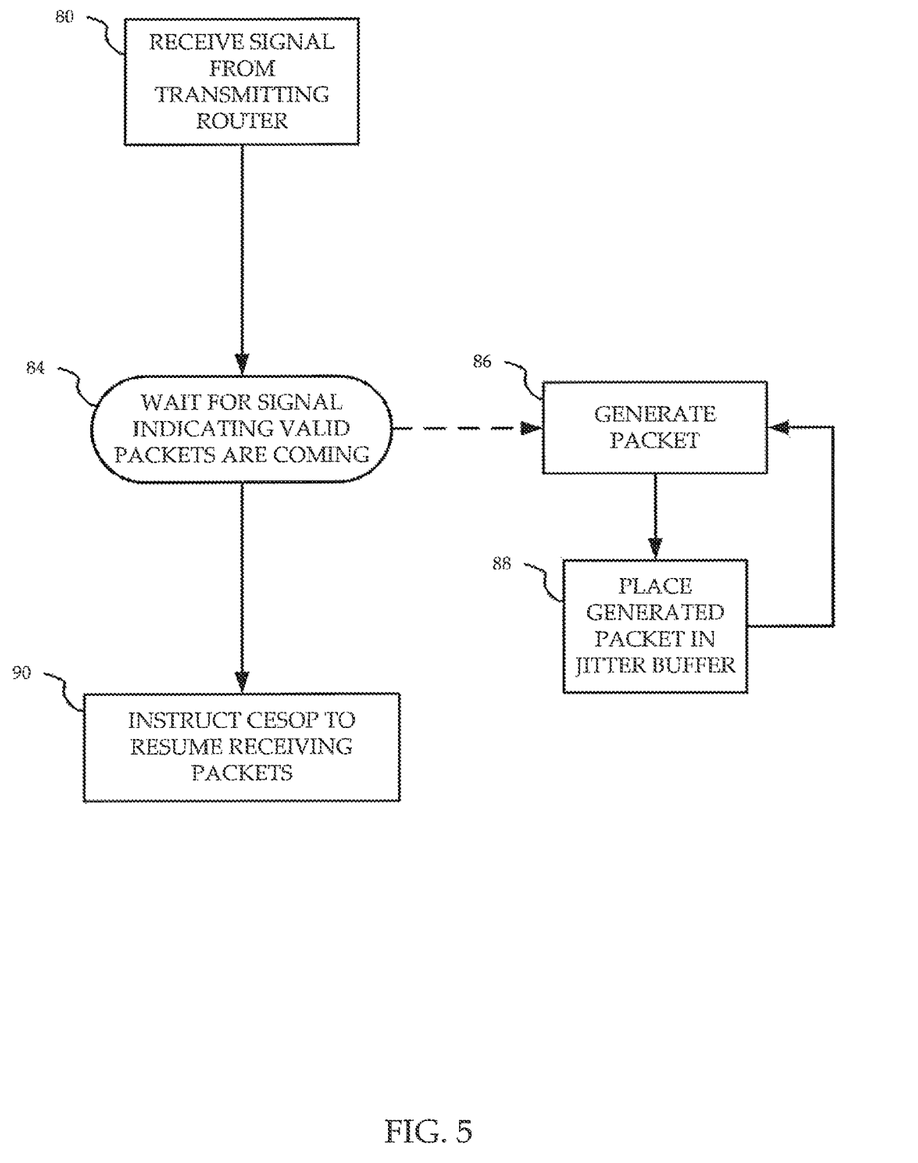
FIG. 5 is a flowchart of a method carried out by the receiving router of FIG. 1 according to one embodiment of the invention.

Referring to FIG. 5, a flowchart of a method carried out by the receiving router 16 of FIG. 1 according to one embodiment of the invention is shown. The method is carried out by the general purpose processor 30 of the receiving router 16. At step 80 the general purpose processor 30 receives a notification that a signal has been received by the receiving router 16 from the transmitting router 10 indicating that no packets will be sent by the transmitting router 10. This signal can be either an explicit signal (such as an out-of-band signal in the signaling layer of MPLS) or an implicit signal (such as a packet in which the L and M bits of the TDM-PW control word have been set to a particular value).

At step 84 the processor 30 awaits notification that a signal has been received by the receiving router 16 from the transmitting router 10 that packets containing valid TDM data are coming. This signal can be either an explicit signal (such as an out-of-band signal in the signaling layer of MPLS) or an implicit signal (such as a packet in which the L and M bits of the TDM-PW control word have been set to values indicating normal CESoP data). Until such notification is received, the processor 30 generates at step 86 a packet to be placed in the jitter buffer 20 of the receiving router 16. The content of this packet is the same as the content of the last packet received by the receiving router 16 containing valid CESoP data. At step 88 the processor 30 places the generated packet within the jitter buffer 20.

In this way the jitter buffer maintains its fill level. Valid data already in the jitter buffer when the receiving router 16 receives notification that no packets will arrive is played out as normal, followed by dummy packets generated by the general purpose processor 30. After all the valid data in the jitter buffer is played out, the jitter buffer will only contain generated packets, which are played out at the configured TDM rate. Only when the receiving router 16 starts receiving valid packets again, as described below, are valid packets placed in the jitter buffer 20 again, to be played out when they reach the head of the queue.

When the processor 30 receives notification at step 84 that a signal has been received by the receiving router 16 from the transmitting router 10 that packets containing valid CESoP data are coming, then at step 90 the processor 30 instructs the CESoP 32 of the receiving router 16 to resume receiving packets and placing them in the jitter buffer 20 as usual. Since the general purpose processor 30 is no longer generating packets and placing them in the jitter buffer 20, valid packets will soon (once they work their way through the jitter buffer as dummy packets are played out) be played out.

The methods described above have been described as being carried out by the general purpose processors in communication with the CESoP processor of the respective router. Alternatively, the methods may be carried out by another component of the router, such as a modified CESoP processor. In such an embodiment, the steps 66 and 74 of FIG. 4 and 90 of FIG. 5 are modified appropriately.

The methods described above are preferably implemented as logical instructions in the form of software. Alternatively, the methods may be implemented by hardware, or as a combination of software or hardware. If in the form of software, the logic may be stored on a non-transitory computer-readable storage medium in a form executable by a computer processor. The logic of the methods may be implemented by a general purpose processor, a network processor, a digital signal processor, an ASIC, or multiple such devices.

Figure 6:
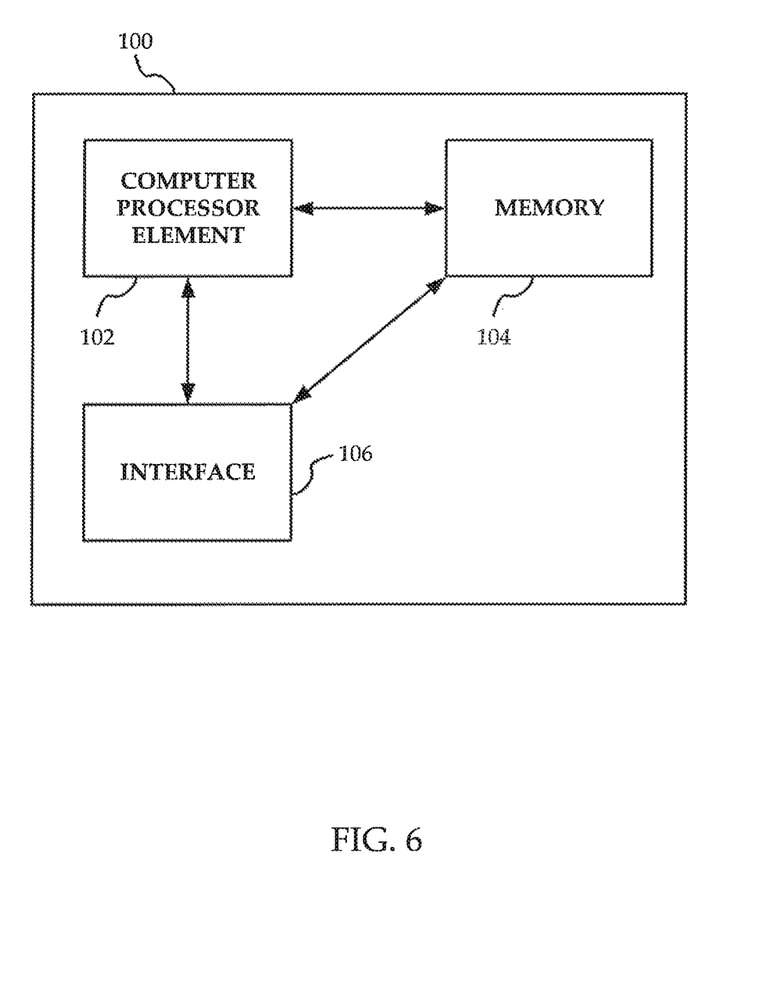
FIG. 6 is a block diagram of a computing environment according to one embodiment of the invention.

A simplified block diagram of one embodiment of a part of either router is shown in FIG. 6 as a processor assembly 100. The processor assembly 100 includes a computer processor element 102 (e.g. a central processing unit and/or other suitable process r(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the methods described above are implemented as software instructions loaded into the memory 104 and causing the computer processor element 102 to execute the methods.

The embodiments presented are exemplary only and persons skilled in the art would appreciate that variations to the embodiments described above may be made without departing from the spirit of the invention. The scope of the invention is solely defined by the appended claims.

We claim:

1. A method of reducing bandwidth usage in a TDM-PW (time division multiplexing pseudowire) conveying digitized analog data, comprising:
   determining at a transmitting router receiving the digitized analog data in TDM frames whether the analog data has changed beyond a threshold for a configured length of time;
   upon determining that the analog data has not changed beyond a threshold for a configured length of time:
      signaling from the transmitting router to a receiving router that no packets corresponding to the TDM-PW will be sent; and
      refraining from transmitting packets over the TDM-PW;
   at the receiving router, upon receipt of a signal from the transmitting router that no packets corresponding to the TDM-PW will be sent:
      generating packets; and
      placing the generated packets in a jitter buffer of the receiving router.

2. The method of claim 1 wherein signaling from the transmitting router to the receiving router that no packets corresponding to the TDM-PW will be sent comprises setting L and M bits in the LRM bits of the TDM-PW control word of a packet to a particular value.

3. The method of claim 1 wherein signaling from the transmitting router to the receiving router that no packets corresponding to the TDM-PW will be sent comprises sending an out-of-band signal at the signaling layer of MPLS.

4. The method of claim 1 wherein generating packets comprises generating packets identical to the valid packet that was most recently received over the TDM-PW.

5. The method of claim 1 wherein signaling from the transmitting router to the receiving router that no packets corresponding to the TDM-PW will be sent further comprises conveying a sequence number of the last valid packet sent over the TDM-PW.

6. The method of claim 1 further comprising:
determining at the transmitting router that newly arrived analog data has changed beyond a threshold;
signaling from the transmitting router to the receiving router that packets corresponding to the TDM-PW are once again being sent; and
upon receipt at the receiving router of a signal from the transmitting router that packets corresponding to the TDM-PW are one again being sent, halting generating of packets and resuming placing of received packets in the jitter buffer.

7. The method of claim 6 wherein signaling from the transmitting router to the receiving router that packets corresponding to the TDM-PW are once again being sent comprises sending a packet containing valid CESoP (circuit emulation service over packet) data and the L and M bits in the LRM hits of the TDM-PW control word of the packet having values indicating that the packet contains valid CESoP data.

8. The method of claim 6 wherein signaling from the transmitting router to the receiving router that packets corresponding to the TDM-PW are once again being sent comprises sending an out-of-band signal at the signaling layer of MPLS.

9. A router providing circuit emulation services for digitized analog data, the digitized analog data having beep received at the router in TDM frames, the router comprising:
a processor; and
memory, the memory comprising instructions that, when executed by the processor, cause the router to:
determine whether the analog data has changed beyond a threshold for a configured length of time; and
upon determination that the analog data has not changed beyond a threshold for a configured length of time:
signal to a receiving router at the other end of the TDM-PW that no packets will be sent over the TDM-PW; and
halt transmitting packets over the TDM-PW.

10. The router of claim 9 wherein the instructions to signal the receiving router comprise instructions to set L and M bits in the LRM bits of the TDM-PW control word of a packet to a particular value.

11. The router of claim 9 wherein the instructions to signal the receiving router comprise instructions to send an out-of-band signal at the signaling layer of MPLS.

12. The router of claim 9 further comprising instructions within the memory that, when executed by the processor, cause the router to:
determine that newly arrived analog data has changed beyond a threshold; and
signal to the receiving router that packets corresponding to the TDM-PW are once again being sent, upon determination that newly arrived analog data has changed beyond the threshold.

13. The router of claim 12 wherein the instructions to signal to the receiving router that packets corresponding to the TDM-PW are once again being sent comprise instructions to set the L and M bits in the LRM bits of a TDM-PW control word of a packet to a value indicating that the packet contains valid CESoP (circuit emulation service over packet) data.

14. A router providing circuit emulation services for digitized analog data, the router comprising:
a processor; and
memory, the memory comprising instructions that, when executed by the processor, cause the router to:
monitor for receipt of a signal from a transmitting router at the other end of a time division multiplexing pseudowire (TDM-PW) that no packets are being sent over the TDM-PW; and
upon receipt of signal that no packets will be sent over the TDM-PW:
generate packets; and
place the generated packets in a jitter buffer.

15. The router of claim 14 wherein the instructions to monitor for receipt of a signal comprise instructions to determine whether L and M bits in the LRM bits of a TDM-PW control word of a packet are set to a particular value.

16. The router of claim 14 wherein the instructions to monitor for receipt of a signal comprise instructions to monitor for an out-of-band signal at the signaling layer of MPLS.

17. The router of claim 14 wherein the instructions to generate packets comprise instructions to generate packets identical to the valid packet that was most recently received over the TDM-PW.

18. The router of claim 14 further comprising instructions in the memory that, when executed by the processor, cause the router to:
monitor for receipt of a signal from the transmitting router that packets are being sent once again over the TDM-PW; and
upon receipt of a signal from the transmitting router indicating that packets are being sent once again:
halt the generation of packets; and
resume placing received packets in the jitter buffer.

* * * * *